(12) United States Patent
Myers et al.

(10) Patent No.: US 6,839,881 B2
(45) Date of Patent: Jan. 4, 2005

(54) LIMITED ACCESS NETWORK DATABASE SYSTEM

(76) Inventors: Michael D. Myers, 4216 Katella Ave., Los Alamitos, CA (US) 90720; Charles R. Christian, 5001 Townsend Ave., Eagle Rock, CA (US) 90041-2216; Derrick K. Bennett, 5001 Townsend Ave., Eagle Rock, CA (US) 90041-2216; Mario C. Murga, 16314 Fieldcrest Ct., La Mirada, CA (US) 90638

( * ) Notice: Subject to any disclaimer, the term of this patent is extended or adjusted under 35 U.S.C. 154(b) by 0 days.

(21) Appl. No.: 09/945,456

(22) Filed: Aug. 30, 2001

(65) Prior Publication Data

US 2002/0004806 A1 Jan. 10, 2002

Related U.S. Application Data

(62) Division of application No. 09/153,786, filed on Sep. 16, 1998, now Pat. No. 6,374,274.

(51) Int. Cl.[7] .............................................. G06F 17/00
(52) U.S. Cl. ...................................................... 715/513
(58) Field of Search ................................ 715/513, 500, 715/501.1, 530, 531; 707/501.1, 513, 530, 531, 500

(56) References Cited

U.S. PATENT DOCUMENTS

| 6,289,460 | B1 | * | 9/2001 | Hajmiragha | 713/200 |
| 6,317,777 | B1 | * | 11/2001 | Skarbo et al. | 709/204 |
| 6,374,274 | B1 | * | 4/2002 | Myers et al. | 707/523 |
| 6,385,652 | B1 | * | 5/2002 | Brown et al. | 709/227 |

OTHER PUBLICATIONS

Legal Anywhere Collaborator Version 3.0, Legal Anywhere, LLC, 1997, the product described in pp. 1–4 of http://http://web.archive.org/web/19981202150347/www.legalanywhere.com/TLI.htm.*

* cited by examiner

Primary Examiner—Sanjiv Shah
(74) Attorney, Agent, or Firm—Jeffrey G. Sheldon; Sheldon & Mak PC

(57) ABSTRACT

A network database system wherein clients of subscribing entities are authorized network access to reliable documents that are identified by each entity as being relevant to clients of that entity. Features that can be included in the system are customization of the documents to reflect sourcing by particular subscribers, automated formatting of the documents for storing in a network database, client access facilitated by subscriber-maintained databases, and the avoidance of cookies remaining on clients' computer hard drives following document access. Also disclosed is a method for processing repeated data requests on a distributed computer database.

11 Claims, 4 Drawing Sheets

LIMITED ACCESS NETWORK DATABASE SYSTEM

This is a division of application Ser. No. 09/153,786, filed Sep. 16, 1998.

Appendix A is a hard copy printout of the assembly listing consisting of 37 pages, including the title page. This assembly listing is subject to copyright protection. The copyright owner has no objection to the reproduction of the patent disclosure as it appears in the Patent and Trademark Office patent files or records, but otherwise reserves all copyright rights whatsoever.

BACKGROUND

The present invention relates to communication networks, and more particularly to networks providing document access to authorized subscribers.

One application of information retrieval systems is to provide (by display, printing, or other appropriate means) a collection of documents that is directed to a particular field, so that a particular set of authorized users can select and retrieve a desired portion of the collection. One example of such a system for use in the office of a professional practice has a terminal connected to a memory device having the collection accessible to it (such a collection of video tapes or compact disk ROM being selectively inserted into a compatible drive unit), the terminal controlling the drive unit to access desired portions of particular ones of the media having documents of interest to clients of the practice. Unfortunately, such systems are expensive to provide, set up, and maintain in that all of the costs must be attributed to a single practice. Also, the set up and maintenance frequently requires skills that are not readily available on site.

A recent development is the wide use of network communications over the Internet, on which a wide variety of information is available in massive volumes using local telephone connections and personal computers. The Internet is actually a collection of networks and gateways that use the Transport Control Protocol/Interface Program (TCP/IP) suite of protocols that was developed by the U.S. Department of Defense. The local telephone connections are typically to nearby network server computers (servers) that have connections to other servers. Documents and other information are commonly stored on the Internet using Hyper Text Transfer Protocol (HTTP) in HTML or ASP format in web sites that are implemented at associated servers, the sites being addressed and navigated by using "browser" software of user's computers. The HTTP version 1.1 (outilined in detail in RFC 2068 at http:www.csl.sony.co.jp/cgibin/hyperrfc?rfc2068.txt) specifies that upon transmission of each requested element, the browser disconnects from the server. Thus the protocol as defined is "connectionless" in that a single continuous connection is not maintained while browsing a website. A great advantage of this technology is that a large segment of the general population has access to the Internet from home. However, much of that information is of questionable validity, especially when provided free of charge, and the location of relevant information can be a daunting task that involves sifting through great volumes of extraneous records.

Consequently, a number of Internet and other computer database services that are restricted to paying subscribers have been developed. These services are commercially viable for business applications; however, they are often excessively expensive and difficult to use in relation to their utility for infrequent personal use. Also, many such services that need to identify users cause authorization information to be transmitted and permanently stored on users' computer hard disk drives. Traditionally Internet servers identify a user by transmitting the requested data along with a special plain text file called a "cookie" which is stored on the user's computer disk memory and can have values written thereto by the server. These cookies typically contain information like the user's name and miscellaneous data that is read back each time the user connects and makes a request, typically for each page or element thereof as indicated above. These cookies are objectionable in that it can contain "viruses" that are known to be harmful to the users' computers. Accordingly, web browsers of the prior art pop up a dialog box that asks whether the user will accept the cookie, further creating an inconvenience to the user. If the user refuses the cookie, then continuity is effectively broken between the browser and the server.

Thus there is a need for a reliable source of information that is relevant to clients of professional practices, that is easily accessed and selected by authorized users, that monitors or tracks user access sessions without requiring users to accept cookies, and that is inexpensive to set up and maintain without requiring high levels of specialized skill by employees of particular practices having clients that are authorized users.

SUMMARY

The present invention meets this need by providing a network database system wherein clients of subscribing entities are authorized network access to reliable documents that are identified by each entity as being relevant to clients of that entity. Features that can be included in the system are customization of the documents to reflect sourcing by particular subscribers, automated formatting of the documents for storing in a network database, client access facilitated by subscriber-maintained databases, and the avoidance of cookies remaining on clients' computer hard drives following document access. It will be understood that while the term "cookie" can include transmitted and stored codes that do not remain following network access and is therefore not considered harmful, as used herein the term is exclusive of transmitted access data that does not remain stored in the client's computer following termination of network access.

DRAWINGS

These and other features, aspects, and advantages of the present invention will become better understood with reference to the following description, appended claims, and accompanying drawings, where:

DESCRIPTION

Figure 4:
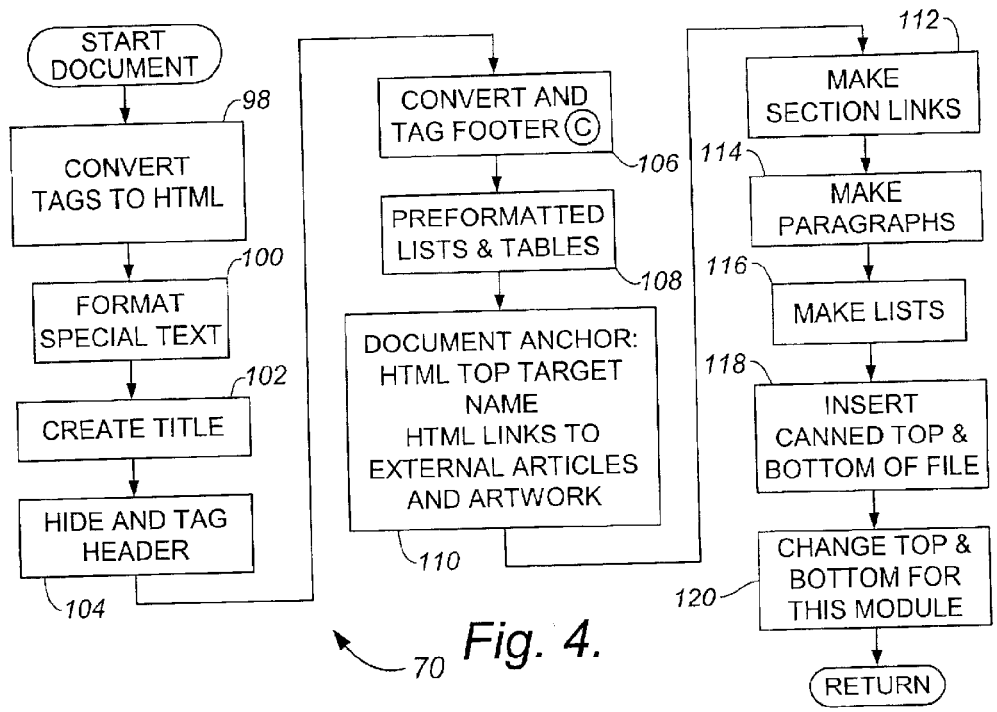
FIG. 4 is a flow chart for an convert document portion of the macro of FIG. 2.
Figure 1:
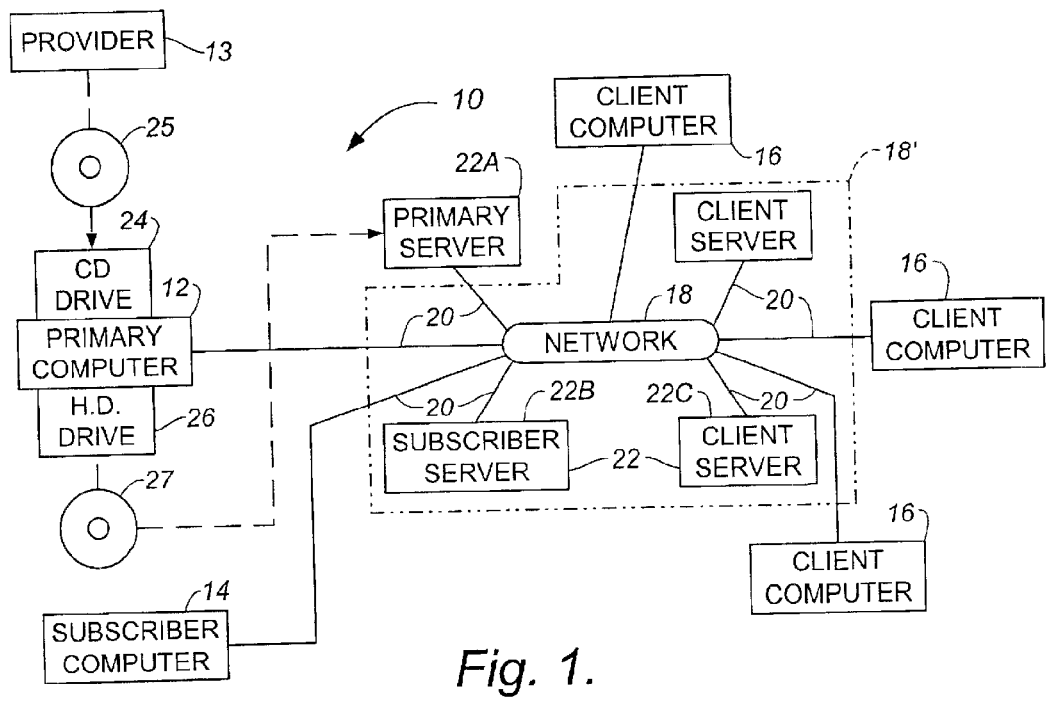
FIG. 1 is a plan view of a database system according to the present invention being connected to a computer database.

The present invention is directed to a document conversion and network database system that is particularly effective in-providing relevant document data to authorized clients of subscriber entities. With reference to FIGS. 1–6 of the drawings, a network database system 10 includes a primary computer 12 for receiving and processing data from a provider 13, a subscriber computer 14, and a client computer 16, each of the computers 12, 14, and 16 being connectable to a distributed computer network 18. In an exemplary implementation, the computer network 18 includes a multiplicity of communication lines 20 and a plurality of server computers 22. One such server, designated 22A, is a primary server that is set up in a conventional manner for directing communications on the network 18 and having additional features in accordance with the present invention that are described below. Optionally, the primary server 22A is principally associated with the primary computer 12 (by a local telephone connection); moreover, the primary computer 12 can be integrated with the primary server 22A. Another server, designated 22B, communicates with the subscriber computer 14, and a further server, designated 22C, communicates with the client computer 16. It will be understood that a single server may communicate with more than one of the computers 12, 14, and 16. Further, it is contemplated that the system includes a plurality of the subscriber computers 14, multiple counterparts of the client computers 16 for each of the subscriber computers 14 and, possibly, a plurality of the primary computers 12. In the exemplary implementation described herein, the communication network 18 is the Internet, with at least some of the communication lines 20 being conventional telephone utility lines, each computer having a suitable modem or digital port (not shown) for interfacing with the telelphone utility lines. As used herein, each of the servers 22 other than the primary server 22A is considered to be a part of a composite network, designated 18'.

A principal feature of the present invention is that the primary computer 12 is implemented for automatically customizing selected documents of the provider to identify the subscriber, and optionally the client, and reformatting the selected documents to facilitate navigation therein by the subscriber's clients. The clients selectively access and navigate the documents using communications between the client computer 16 and the client server 22C. The primary computer 12 includes a CDROM drive 24 for receiving and inputting source disks 25 that may be periodically received from the provider 13. The computer 12 may also include a high-density disk drive 26 for writing processed counterparts of the received data on output disks 27 for delivery to the primary server 22A. It will be understood that the CDROM drive 24 and the high-density drive 26 can be a single device, and further that the processed data can be transmitted to the primary server 22A over the network 18 instead of being delivered on the high-density disks. A suitable primary server 22A can be implemented with the server computer 22 running WINDOWS NT 4.0, MICROSOFT INTERNET INFORMATION server 4.0, MICROSOFT INDEX server, MICROSOFT SITE-SERVER EXPRESS, MICROSOFT ACTIVE SERVER PAGES, MICROSOFT SQL SERVER 6.5, and MICROSOFT TRANSACTION SERVER that are commercially available programs of Microsoft Corp. of Redmond, W.Va., the uppercase terms being believed to be respective trademarks of Microsoft. According to the present invention, the server 22A is further programmed for authorizing and tracking client access as described below in connection with a subscriber and client database that can be implemented in the above-identified SQL Server program.

Document Conversion

The source disk 25 preferably contains the data from the provider 13 in a plurality of document files, one or more index files, and one or more map files, illustrations, the map files defining links to related documents and images. In an exemplary implementation, the various files are stored as compressed text files in American Standard for Information Interchange (ASCII) format. Typically, certain text is delimited with special codes, such as by being enclosed in brackets, as "[ . . . ]". Preferably, the text files have imbedded tags for delimiting titles, subtitles, sections, headers, footers, etc. However, HTML tags are appropriately locatable for aesthetically formatting the documents and facilitating navigation thereof based on the document structure alone, without reliance on imbedded tags being in the raw ASCII files. For example, titles and subtitles may be identified by having a length of only one line.

Figure 2:
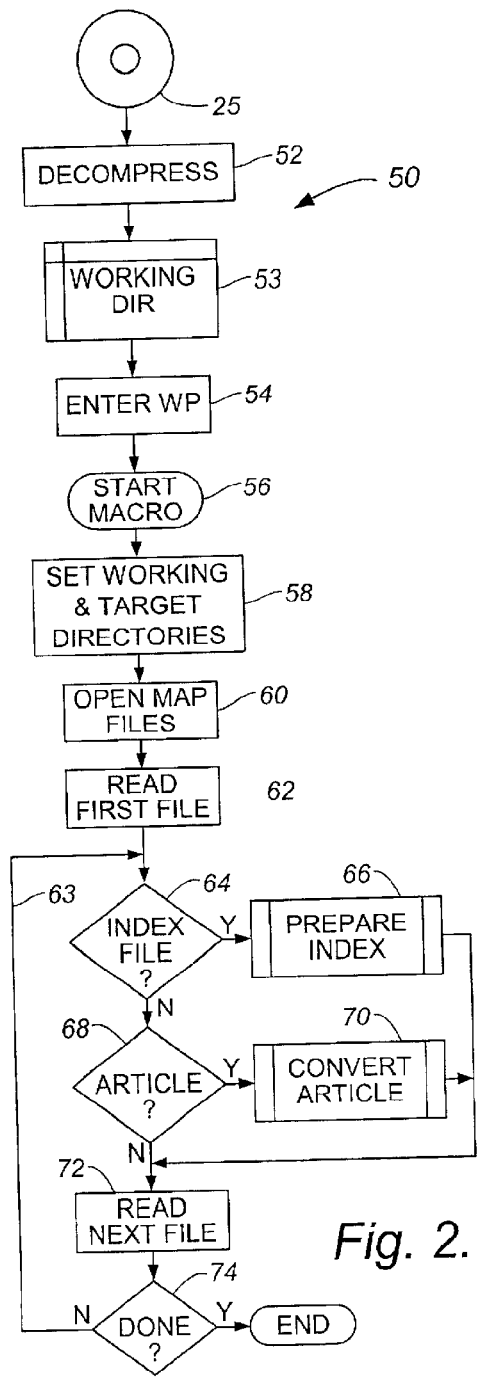
FIG. 2 is a flow chart for a document conversion macro of the system of FIG. 1.

As shown in FIG. 2, a document conversion process 50 is operable when the source disk 25 is mounted in the CD drive 24. The process includes a conventional decompress step 52 wherein compressed file archives of the provider 13 on the disk 25 are decompressed and each of the resulting files is copied as ASCII text in a suitable hard disk memory working directory 53 of the primary computer 12. Next, a suitable word processor program is entered in a start word process step 54 and a conversion macro 56 is invoked for processing the source text as described herein. Suitable word processor programs include MICROSOFT WORD 7.0 and MAC WORD, as appropriate for suitable IBM-compatible and MCINTOSH implementations of the primary computer 12, each program being available from Microsoft Corp., MCINTOSH being believed to be a trademark of Apple Computer Corp. In each of these implementations, the conversion macro 56 is appropriately coded in VISUAL BASIC, also available from Microsoft Corp.

In the conversion macro 56, the working directory 53 as well as a target directory are determined in an initialize step 58, and linkmap and docmap files therein are opened in an open map step 60. In the initialize step 58, one of several possible modules of the files is selectable according to available categories of the information. For example in the case of medical documents, exemplary categories are Adult Health, Pediatric Health, Behavorial Health, Women's Health, etc. as further enumerated in the above-referenced listing of Appendix A. The working directory can be a particular subdirectory having the selected category of documents. Next, a file is read from the top of the directory 53 in a read first file step 62, and a loop 63 is entered wherein a test index step 64 is performed. This test is firstly on the filename main part for bypassing signon and menu files, for example, and secondly on the extension, also bypassing "*.art" artholder files, the test branching to a prepare index step 66 that is described below in connection with FIG. 3 if the extension is ".idx". If not, control advances to test article step 68 that for normal articles and similar files such as credits and menus branches to a convert article step 70 that is described below in connection with FIG. 4. Otherwise in each case of bypassing, the macro advances to a read next file step 72, followed by a test done step 74 whereby the loop 63 is repeated unless there was no next file, in which the macro 56 ends, completing the process 50.

Figure 3:
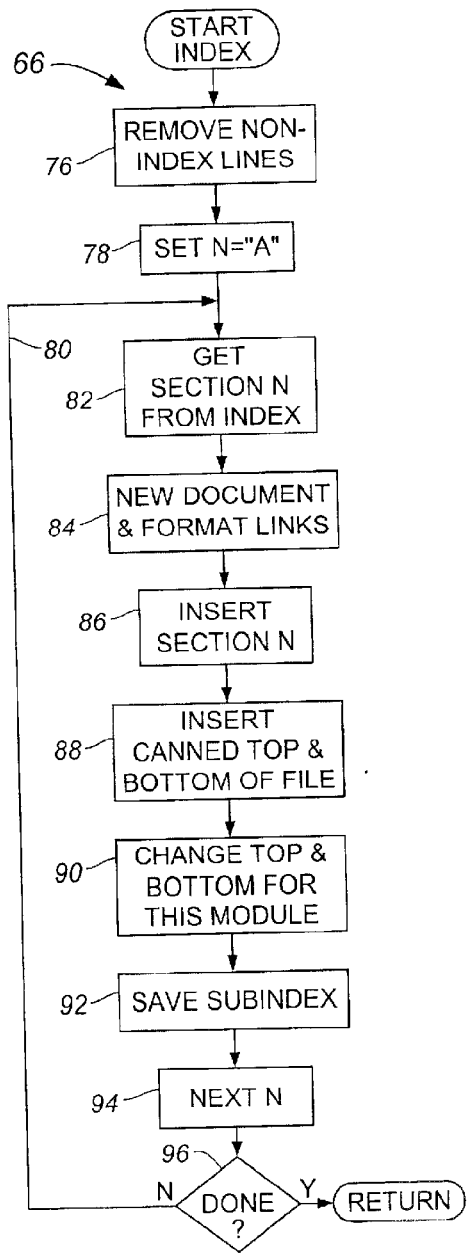
FIG. 3 is a flow chart for an index preparation portion of the macro of FIG. 2

As shown in FIG. 3, the prepare index step 66 includes a strip step 76 for removing non-index lines from the current (index) file. A variable η is set to "A" in a set topic pointer step 78, whereupon a loop 80 is entered in which a get section step 82 finds lines that begin with the letter η, with allowance for the absence of topics having that identification, and further allowance for the topic η having subheadings. Next, in a convert links step 84, index links are converted to HTML links, and the section η is replaced in an insert section step 86. Predefined top and bottom content is then added to the file in an add boilerplate step 88, that content being next modified (by specifying a subindex name, etc.) to be consistent with the selected module in a specialize boilerplate step 90, after which the current index portion is saved in a save subindex step 92. The topic letter η is then incremented in an increment pointer step 94, and a test loop step 96 is performed for repeating the loop 88 until done, in which case control is returned to the main portion of the macro 56.

As shown in FIG. 4, the convert article step 70 first finds and replaces embedded tags of the current raw article file with corresponding HTML commented tags in a convert tags step 98. Text that is delimited with special characters is located, and corresponding HTML delimeters are substituted therefor in a special text step 100. Particularly, bolded text in the raw ASCII files is delimited by brackets (" . . . [bolded text] . . . "), being changed by the special text step 100 to ". . . <b>bolded text</b>. . . ". A window title and a displayed article title are created in a create title step 102 that also adds top and bottom HTML tags to the file. Unused header information is then hidden by comment codes, and delimited with appropriate tags in a hide header step 104.

Typically, the raw ASCII file has a footer containing a copyright notice, there being a need for improving the form and content of the notice. Accordingly, the footer/copyright information is segregated with lines and italics being added in a convert footer step 106. Also, if there are sets of tags delimiting reformatted text that should not be altered (such as lists, menus and tables), tags delimiting such text are changed to corresponding HTML tags in a convert preformat step 108. For example "<!--/btable --> . . . table text . . . <!--/btable -->" is changed to "<pre>. . . </pre>". Next, a document anchor step 110 establishes a document target name at the top of the file in HTML format, and extracts external target articles and artwork using the linkmap and docmap files, and imbeds corresponding HTML links.

Following the document anchor step 110, a section links step 112 selects section headings and adds copies thereof at the top of the article, the copies being hot-linked into the article body. The section links step 112 makes use of imbedded tags (if present) and structural characteristics of the raw ASCII file to identify the section headings. Next, a paragraphs step 114 converts imbedded paragraph tags to HTML paragraph tags. In the case of indented paragraphs, that text is delimited by "<bodyquote> . . . indented text . . . </bodyquote>" tags. Simple bulleted lists are then converted from reformatted text into properly formatted HTML lists in a make lists step 116. More complex lists are also reformatted, if feasible; otherwise they are left as reformatted text.

Finally, predefined top and bottom content is then added to the file in an add boilerplate step 118, for providing a consistent appearance in all article files. That content is next modified in a specialized boilerplate step 120 using pre-defined markers having the actual module name, etc. as in the above-described specialize boilerplate step 90 of FIG. 3.

Upon completion of the conversion macro 56, the document and index files, stored in HTML/ASP format are transmitted by any suitable means to the primary server 22A. As an alternative to using the high-density disk 27 as described above, the files can be uploaded by transmission over the network 18.

Subscriber Navigation

Figure 5:
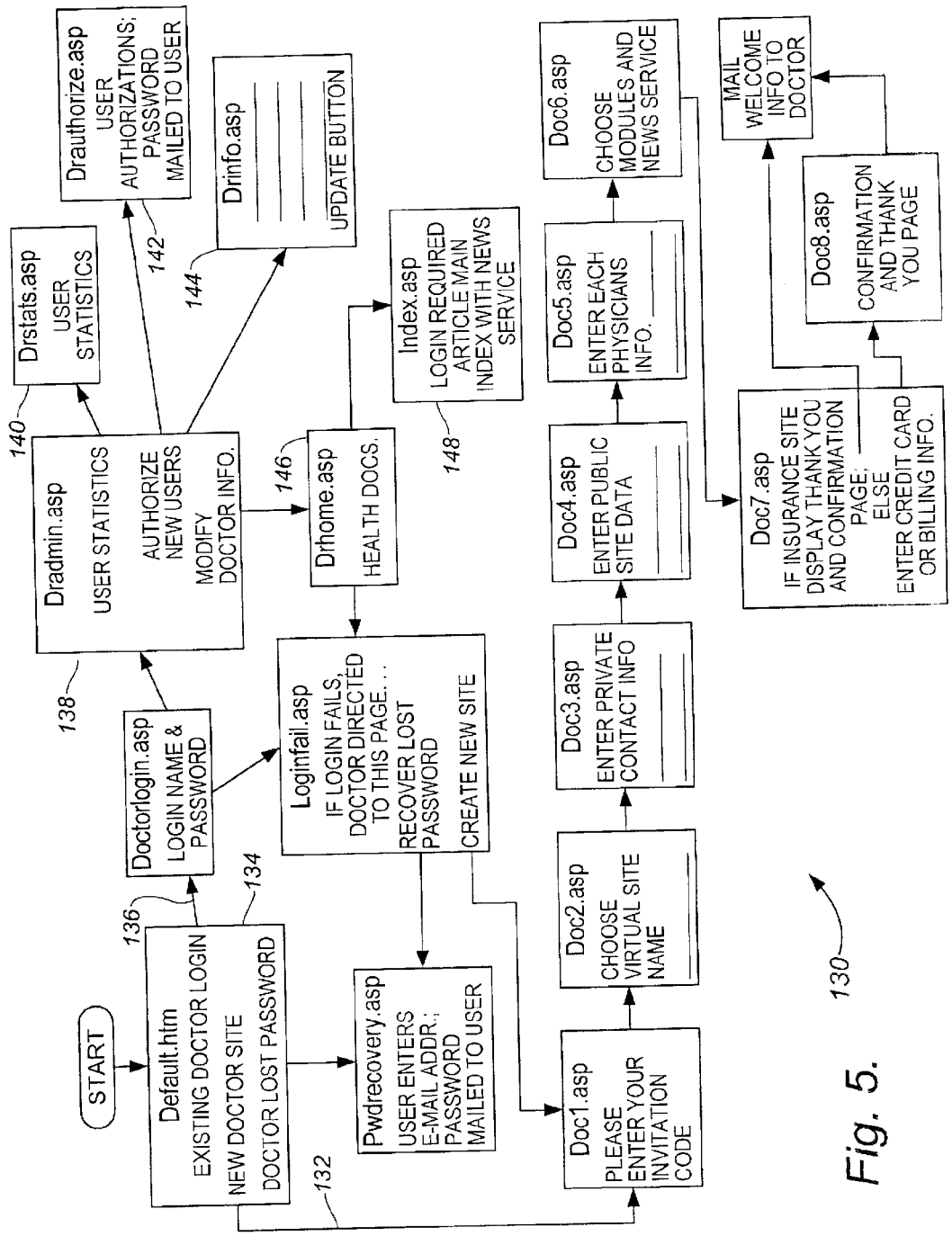
FIG. 5 is a navigation path diagram for a subscriber entity portion of the system of FIG. 1.

In the exemplary Internet implementation of the system 10, the primary server 22A has a default web page that is addressable from the subscriber computer 14 and any of the client computers 16. As shown in FIG. 5, a subscriber navigation path 130 permits a subscriber to set up a practice-specific home page using a new site selection option 132 from the default page, designated 134. In a practitioner registration process, after appropriate information concerning the site is entered using a series of screens, a username and and password for the site is generated at the primary server 22A, and a virtual website is created as described below. As indicated in FIG. 5, this information is not immediately available to the subscriber, being subsequently e-mailed (following verification of financial arrangements if desired), the primary server 22A being implemented in a conventional manner for communicating the username and password to the subscriber computer 14. Alternatively, the subscriber's usernme and password can be passed over the network 18 to be displayed on the subscriber computer 14 and saved by the subscriber.

The subscriber navigation path 130 also includes a practitioner login path 136 that is password protected according to the present invention. Once the subscriber has transmitted the username and password to the primary server 22A, the server transmits corresponding codes directed to a username and password header portion of the web browser being run in the subscriber computer. Thus in subsequent browser requests directed to the family of web page locations, the same username and password is automatically passed to the server 22A as a part of the request. This is an important feature of the present invention that avoids the risks and inconvenience of the subscriber computer 14 having to accept cookies from the server 22A, which cookies might possibly contain harmful viruses. Appropriate coding for passing the username and password into the appropriate header field of the subscriber's or client's web browser is included in the ODBC program module of the primary server 22A, the details of such code being within the skill of the web-server programing art.

Following successful login, control passes to an administration page 138 from which the subscriber can generate and maintain client data/statistics using a stats window 140, the client data being retained by the primary server 22A in the above-identified SQL server. The subscriber can also authorize new users in an authorize window 142, or amend the previously entered site data in an information window 144. Additionally, the subscriber can access the above-described converted documents from a practioner home page 146, from which an index window 148 facilitates identification of sought-for information. A new and completely different virtual website is created for each practitioner of the subscriber that completes the practitioner registration process. Thus another important feature of the present invention is that although the registration process of the new site path 132 process requires only five to ten minutes to complete, the resulting practice-specific website appears to have required hours of highly skilled labor to produce, just for the practitionsr's clients. The practitioners may efficiently promote themselves with these websites, extending the client educational materials of the converted documents to the clients with very little effort.

Client Navigation

Figure 6:
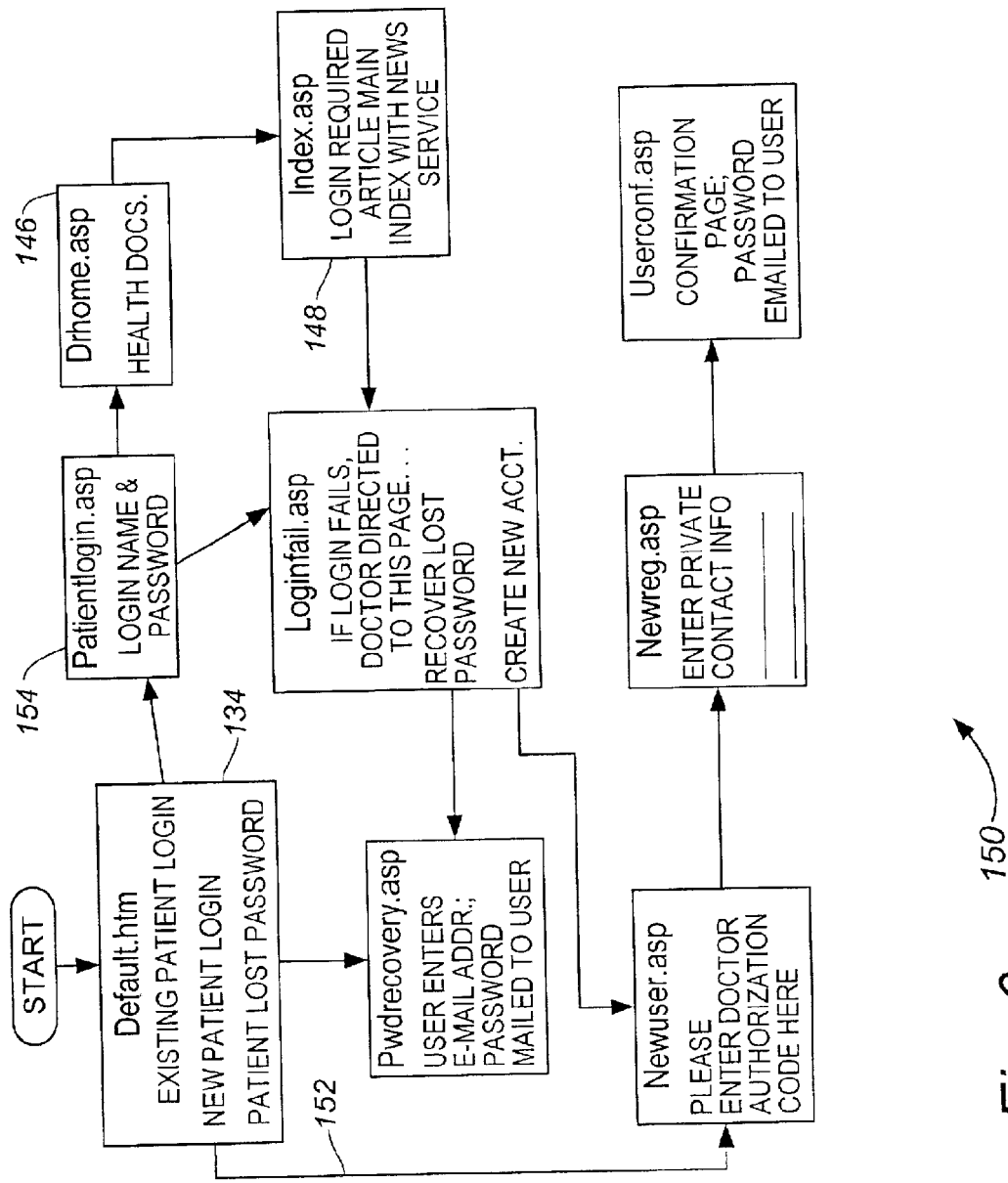
FIG. 6 is a navigation path diagram for a client network access to the system of FIG. 1.

As shown in FIG. 6, clients of any of the subscribers can also access the default web page 134 from a client computer 16 as described above in connection with FIG. 5. As shown in FIG. 6, a client navigation path 150 permits a client to register using a new client selection option 152 from the default page 134. After appropriate information concerning the client is entered using a series of screens, a username and password for the client is generated at the primary server 22A. The information required from the client can include last name, first name, middle initial, mailing address, telephone number, a personal password, and an e-mail address. Of course some of this information can be omitted, particularly if it has already been provided to the SQL client database, a minimal requirement being that there be sufficient information transmitted from the client to distinguish from other clients. As indicated in FIG. 5, the username and password information is not immediately available to the client as described above in connection with FIG. 5, being subsequently e-mailed (with instructions for using the site). It will be understood that the subscriber can communicate the subscriber's username or any other predetermined designation given to the patient for permitting the client to complete the registration process, which designation can serve as temporary authorization pending granting of the patient's username and password. Also, the client's permanent password can be either chosen by the client or generated by the server 22A. Once registered, patients have access from the default page 134 and a client login window 154 to the subscriber's home page 146 and the index page 148.

Most preferably, the initial client authorization is unique to each practitioner of the subscriber, each of the practitioner virtual home pages having a respective address that is terminated by the corresponding authorization term, whereby the first screen that the client sees is his practitioner's virtual home page. This page then links to the document modules that the practitioner originally selected during the practitioner registration process.

In a preferred form, each client education article begins as follows:

"Welcome, <client's first name><Client's last name> to [systemowner].net. This client education material has been provided to you by <practitioner's practice name>."

Of course, many variations of the above may be appropriate. Anything that is stored in the practitioner/client database(s) can be displayed on the document pages, so that they can be personalized messages.

Document Compilation

The converted documents are dynamically compiled in a process that first reads the header field "WWW-Authenticate" for the username, that field reading " . . . WWW-Authenticate username:password . . . ." An exemplary form of the corresponding record of the SQL database reads:

Username|firstname|lastname|mi|lastlogin date|etc.

A suitable select statement for extracting the client's name is:

Select "fname" "mi" "lname" from table where username="X".

An exemplary HTML coding for each web-page is:

Welcome <% fname %> <% lname %> to Ssytemowner.net

This web-site has been provided by
<%practicename%>

Here is the article text . . .
text end.

Basically, the primary server 22A looks at each page before sending it out and replaces the placeholders or variables with the corresponding information from the database table. Any fields of the database can be inserted into the documents. The pre-processed pages are then sent to the client's browser to complete each of the client's requests. Suitable program code for directing this dynamic compilation is provided in the SMTP program module of the primary server 22A, the details of such code being within the skill of the web-server programing art.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A method for processing data requests from clients of particular practitioners of subscribing entities on a distributed computer network, the method comprising the steps of:

(a) maintaining a main document database of text containing documents for use by multiple unrelated subscribing entities;

(b) registering the multiple different unrelated subscribing entities;

(c) registering at least one practitioner from each subscribing entity;

(d) processing document selections of the registered practitioners from the main document database to identify respective home document sets of the registered practitioners;

(e) automatically modifying the text of at least some of the documents of each home document set so that the modified documents are different from the corresponding documents in the main document data base;

(f) identifying requesting users as clients of corresponding registered practitioners;

(g) processing client requests for permitting access by particular clients to modified documents of the home document sets of corresponding registered practitioners; and (h) transmitting requested pages of the home document sets to the particular clients.

2. The method of claim 1, further comprising maintaining at least one practitioner database, and wherein the step of transmitting comprises transmitting portions of the practitioner database in the pages being transmitted to the particular clients.

3. The method of claim 1, further comprising maintaining a at least one client database, and wherein the step of transmitting comprises transmitting client-specific portions of the client database in the pages being transmitted to the particular clients.

4. The method of claim 3, further comprising maintaining client data and/or statistics of the particular clients in the client database.

5. The method of claim 4, further comprising tracking client access to the home document sets.

6. The method of claim 1, further comprising receiving data from a provider separate from the practitioners, and using the data to form the main document database.

7. The method of claim 1, further comprising maintaining a subscriber navigation path for registering specific practices of each subscriber and practitioners of each practice.

8. The method of claim 1, further comprising maintaining a client navigation path for identifying the home document sets of the practitioners to the clients of the corresponding practitioners.

9. The method of claim 1, wherein the step of maintaining the main document database comprises receiving source document data from a source separate from the practitioners.

10. The method of claim 1, further comprising dynamically including client-specific and/or practitioner-specific data in pages of the home document sets being transmitted to the particular clients.

11. The method of claim 1, wherein the main document database comprises documents not provided by any subscriber.

* * * * *